US008383244B2

(12) United States Patent
Bayer et al.

(10) Patent No.: US 8,383,244 B2
(45) Date of Patent: Feb. 26, 2013

(54) SEMIAROMATIC MOLDING COMPOUNDS AND USES THEREOF

(75) Inventors: Andreas Bayer, Domat/Ems (CH);
Nikolai Lamberts, Bonaduz (CH);
Botho Hoffmann, Domat/Ems (CH);
Manfred Hewel, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

(21) Appl. No.: 13/481,451

(22) Filed: May 25, 2012

(65) Prior Publication Data
US 2012/0321829 A1    Dec. 20, 2012

(30) Foreign Application Priority Data
Jun. 17, 2011    (EP) .................................... 11004967

(51) Int. Cl.
*B32B 27/08*    (2006.01)
(52) U.S. Cl. .................... 428/474.4; 428/35.7; 428/36.4; 428/36.9; 428/297.4; 428/299.1; 428/299.4; 428/475.5; 525/432; 525/420; 525/419; 525/418
(58) Field of Classification Search ................. 525/432, 525/420, 419, 418; 428/474.4, 475.5, 35.7, 428/36.4, 36.9, 297.4, 299.1, 299.4
See application file for complete search history.

(56) References Cited

U.S. PATENT DOCUMENTS

| 2,516,585 | A | 7/1950 | Pease |
| 4,036,811 | A | 7/1977 | Noetzel et al. |
| 4,076,664 | A | 2/1978 | Pagilagan |
| 4,212,777 | A | 7/1980 | Goletto |
| 4,345,066 | A | 8/1982 | Rüter |
| 4,603,166 | A | 7/1986 | Poppe et al. |
| 4,680,379 | A | 7/1987 | Coquard et al. |
| 4,731,421 | A | 3/1988 | Hoppe et al. |
| 4,826,951 | A | 5/1989 | Coquard et al. |
| 4,831,108 | A | 5/1989 | Richardson et al. |
| 4,847,356 | A | 7/1989 | Hoppe et al. |
| 5,071,924 | A | 12/1991 | Koch et al. |

(Continued)

FOREIGN PATENT DOCUMENTS

| CA | 861620 | 1/1971 |
| CA | 2019904 | 1/1991 |

(Continued)

OTHER PUBLICATIONS

U.S. Appl. No. 10/536,494, filed Oct. 5, 2006.

(Continued)

*Primary Examiner* — Michael C Miggins
(74) *Attorney, Agent, or Firm* — Leydig, Voit & Mayer, Ltd.

(57) ABSTRACT

Disclosed is a polyamide molding compound having heat aging resistance for use as automobile or electrical components and composed of: (A) 27-84.99 wt % of a polyamide mixture consisting of (A1) at least one semiaromatic, semicrystalline polyamide having a melting point of 255° C. to 330° C., (A2) at least one caprolactam-containing polyamide that is different from (A1) and that has a caprolactam content of at least 50 wt %, where the total caprolactam content is 22-30 wt %, with respect to the polyamide mixture, (B) 15-65 wt % of at least one filler and reinforcing agent, (C) 0.01-3.0 wt % of at least one thermal stabilizer, and (D) 0-5.0 wt % of at least one additive, where the components (A)-(D) add up to 100 wt %.

20 Claims, 1 Drawing Sheet

Breaking strength (MPa) after storage at 250°C

U.S. PATENT DOCUMENTS

| Number | | Date | Name |
|---|---|---|---|
| 5,081,222 | A | 1/1992 | Reimann et al. |
| 5,098,940 | A | 3/1992 | Brooks |
| 5,177,177 | A | 1/1993 | Thullen et al. |
| 5,177,178 | A | 1/1993 | Thullen et al. |
| 5,191,060 | A | 3/1993 | Akkapeddi et al. |
| RE34,447 | E | 11/1993 | Poppe et al. |
| 5,266,655 | A * | 11/1993 | Prevost et al. ............... 525/432 |
| 5,278,231 | A | 1/1994 | Chundury |
| 5,302,691 | A | 4/1994 | Soelch |
| 5,310,860 | A | 5/1994 | Maj et al. |
| 5,422,418 | A | 6/1995 | Maj et al. |
| 5,480,945 | A | 1/1996 | Vicik |
| 5,560,398 | A | 10/1996 | Pfleger |
| 5,674,973 | A | 10/1997 | Pipper et al. |
| 5,684,120 | A | 11/1997 | Torre |
| 5,688,901 | A | 11/1997 | Fisch et al. |
| 5,708,125 | A | 1/1998 | Liedloff et al. |
| 5,773,556 | A | 6/1998 | Kleiner et al. |
| 5,786,086 | A | 7/1998 | Frihart et al. |
| 5,807,972 | A | 9/1998 | Liedloff et al. |
| 5,917,004 | A | 6/1999 | Liedloff et al. |
| 6,204,355 | B1 | 3/2001 | Dalla Torre et al. |
| 6,255,371 | B1 | 7/2001 | Schlosser et al. |
| 6,270,560 | B1 | 8/2001 | Kleiner et al. |
| 6,291,633 | B1 | 9/2001 | Nakamura |
| 6,319,986 | B1 | 11/2001 | Amimoto et al. |
| 6,365,071 | B1 | 4/2002 | Jenewein et al. |
| 6,547,992 | B1 | 4/2003 | Schlosser et al. |
| 6,943,231 | B2 | 9/2005 | Bühler |
| 7,014,315 | B2 | 3/2006 | Iori et al. |
| 7,249,844 | B2 | 7/2007 | Sakai |
| 7,723,411 | B2 | 5/2010 | Schneider |
| 8,022,170 | B2 | 9/2011 | Hoffman et al. |
| 2001/0007888 | A1 | 7/2001 | Asano |
| 2003/0018107 | A1 | 1/2003 | Heinen et al. |
| 2003/0023008 | A1 | 1/2003 | Uchida et al. |
| 2003/0126788 | A1 | 7/2003 | Uang et al. |
| 2003/0235666 | A1 | 12/2003 | Bühler |
| 2004/0158028 | A1 | 8/2004 | Bühler |
| 2005/0049339 | A1 | 3/2005 | Knop et al. |
| 2005/0101708 | A1 | 5/2005 | Knop et al. |
| 2006/0138391 | A1 | 6/2006 | Drewes et al. |
| 2006/0235190 | A1 | 10/2006 | Hoffmann et al. |
| 2006/0264542 | A1 | 11/2006 | Schneider |
| 2007/0072970 | A1 | 3/2007 | Schneider |
| 2007/0123632 | A1 | 5/2007 | Rexin et al. |
| 2007/0222941 | A1 | 9/2007 | Sakai |
| 2007/0270544 | A1 | 11/2007 | Bühler et al. |
| 2008/0135720 | A1 | 6/2008 | Bühler et al. |
| 2009/0127740 | A1 | 5/2009 | Kirchner |
| 2010/0022742 | A1 | 1/2010 | Bühler et al. |
| 2010/0227122 | A1 | 9/2010 | Kumazawa et al. |
| 2010/0279111 | A1 | 11/2010 | Philipp et al. |
| 2011/0105655 | A1 | 5/2011 | Harder et al. |
| 2011/0220667 | A1 | 9/2011 | Pfleghar et al. |

FOREIGN PATENT DOCUMENTS

| | | | |
|---|---|---|---|
| CH | 280367 | | 1/1952 |
| DE | 24 47 727 | A1 | 4/1976 |
| DE | 26 42 244 | A1 | 3/1977 |
| DE | 36 00 015 | A1 | 7/1986 |
| DE | 43 29 676 | A1 | 3/1994 |
| DE | 195 37 614 | A1 | 4/1997 |
| DE | 199 20 276 | A1 | 11/2000 |
| DE | 199 33 901 | A1 | 2/2001 |
| DE | 102 24 947 | A1 | 12/2003 |
| DE | 102 59 048 | A1 | 7/2004 |
| DE | 103 16 873 | A1 | 11/2004 |
| DE | 103 46 326 | A1 | 5/2005 |
| DE | 694 28 832 | T3 | 2/2007 |
| EP | 0 196 981 | A1 | 10/1986 |
| EP | 0 246 620 | A2 | 11/1987 |
| EP | 0 288 269 | A1 | 10/1988 |
| EP | 0 299 444 | A2 | 1/1989 |
| EP | 0 360 611 | A2 | 3/1990 |
| EP | 0 376 616 | B1 | 7/1990 |
| EP | 0 410 301 | A1 | 1/1991 |
| EP | 0 449 466 | A1 | 10/1991 |
| EP | 0 469 435 | A1 | 2/1992 |
| EP | 0 508 054 | A2 | 10/1992 |
| EP | 0 550 314 | A1 | 7/1993 |
| EP | 0 550 315 | A1 | 7/1993 |
| EP | 0 659 534 | A2 | 6/1995 |
| EP | 0 693 515 | A1 | 1/1996 |
| EP | 0 699 708 | A2 | 3/1996 |
| EP | 0 792 912 | A2 | 9/1997 |
| EP | 0 818 491 | A2 | 1/1998 |
| EP | 0 837 087 | A1 | 4/1998 |
| EP | 0 771 846 | B1 | 1/2002 |
| EP | 1 369 447 | A1 | 12/2003 |
| EP | 1 475 403 | A1 | 11/2004 |
| EP | 1 548 059 | A1 | 6/2005 |
| EP | 1 630 590 | A1 | 3/2006 |
| EP | 1 712 581 | A1 | 10/2006 |
| EP | 1 752 492 | A1 | 2/2007 |
| EP | 1 845 123 | A1 | 10/2007 |
| EP | 1 942 296 | A1 | 7/2008 |
| EP | 1 972 659 | A1 | 9/2008 |
| EP | 2 060 596 | A1 | 5/2009 |
| EP | 2 060 607 | A1 | 5/2009 |
| EP | 2 082 861 | A1 | 7/2009 |
| EP | 1 474 459 | B1 | 11/2009 |
| EP | 2 365 033 | A1 | 9/2011 |
| GB | 766927 | | 1/1957 |
| GB | 1548431 | | 7/1979 |
| JP | 54-071191 | A | 6/1979 |
| JP | 61-200125 | A | 9/1986 |
| JP | 63-023927 | A | 2/1988 |
| JP | 02-302440 | A | 12/1990 |
| JP | 03-050264 | A | 3/1991 |
| JP | 05-125184 | A | 5/1993 |
| JP | 06-511281 | T | 12/1994 |
| JP | 08-239469 | A | 8/1996 |
| JP | 08-259808 | A | 10/1996 |
| JP | 09-078351 | A | 3/1997 |
| JP | 10-168183 | A | 6/1998 |
| JP | 10-219026 | | 8/1998 |
| JP | 2001-261973 | | 9/2001 |
| JP | 2004-083858 | | 3/2004 |
| JP | 2006-045390 | | 2/2006 |
| WO | WO 90/02017 | A1 | 3/1990 |
| WO | WO 92/01389 | A1 | 2/1992 |
| WO | WO 92/10525 | A1 | 6/1992 |
| WO | WO 94/29367 | A1 | 12/1994 |
| WO | WO 95/01389 | A1 | 1/1995 |
| WO | WO 97/39053 | A1 | 10/1997 |
| WO | WO 99/02606 | A1 | 1/1999 |
| WO | WO 01/21698 | A1 | 3/2001 |
| WO | WO 02/28953 | A1 | 4/2002 |
| WO | WO 02/090421 | A2 | 11/2002 |
| WO | WO 2004/055084 | A2 | 7/2004 |
| WO | WO 2004/078848 | A1 | 9/2004 |
| WO | WO 2004/090036 | A1 | 10/2004 |
| WO | WO 2006/74934 | A1 | 7/2006 |
| WO | WO 2007/080754 | A1 | 7/2007 |
| WO | WO 2007/087896 | A1 | 8/2007 |
| WO | WO 2009/062692 | A2 | 5/2009 |

OTHER PUBLICATIONS

U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
"Biax, ein neuer Prüfkörper" (BIAX, a new inspection piece), published in Noss'Ovra staff magazine, Dec. 2006, No. 12, 29th year, EMS-CHIMIE AG (4 pgs.).
Cramer et al., "Some Isomorphous Copolyamides," *Journal of Polymer Science*, vol. 21, pp. 237-250 (1956).
Dolden, "Structure-property relationships in amorphous polyamides," *Polymer*, vol. 17, pp. 875-892 (1976).
Edgar et al., "The p-Phenylene Linkage in Linear High Polymers: Some Structure-Property Relationships," *Journal of Polymer Science*, vol. 8, No. 1, pp. 1-22 (1952).

Henkel Corporation, "Empol Dimer and Polybasic Acids: Technical Bulletin 114C," (1997).

Laura et al., "Effect of rubber particle size and rubber type on the mechanical properties of glass fiber reinforced, rubber-toughened nylon 6," *Polymer*, vol. 44, No. 11, pp. 3347-3361 (2003).

Levine et al., "Isomorphous Replacement in a Copolyamide System," *Journal of Polymer Science*, Issue XLIX, pp. 241-246 (1961).

Unichema International, "Pripol C36-Dimer Acid,".

Yu et al., "Isomorphous Replacement in a Copolyamide System: Homologs of Adipic and Terephthalic Acids," *Am. Chem. Soc.*, Issue 81, pp. 5361-5365 (1959).

European Patent Office, Extended European Search Report in EP Patent Application No. 11004967.3 (Nov. 11, 2011).

* cited by examiner

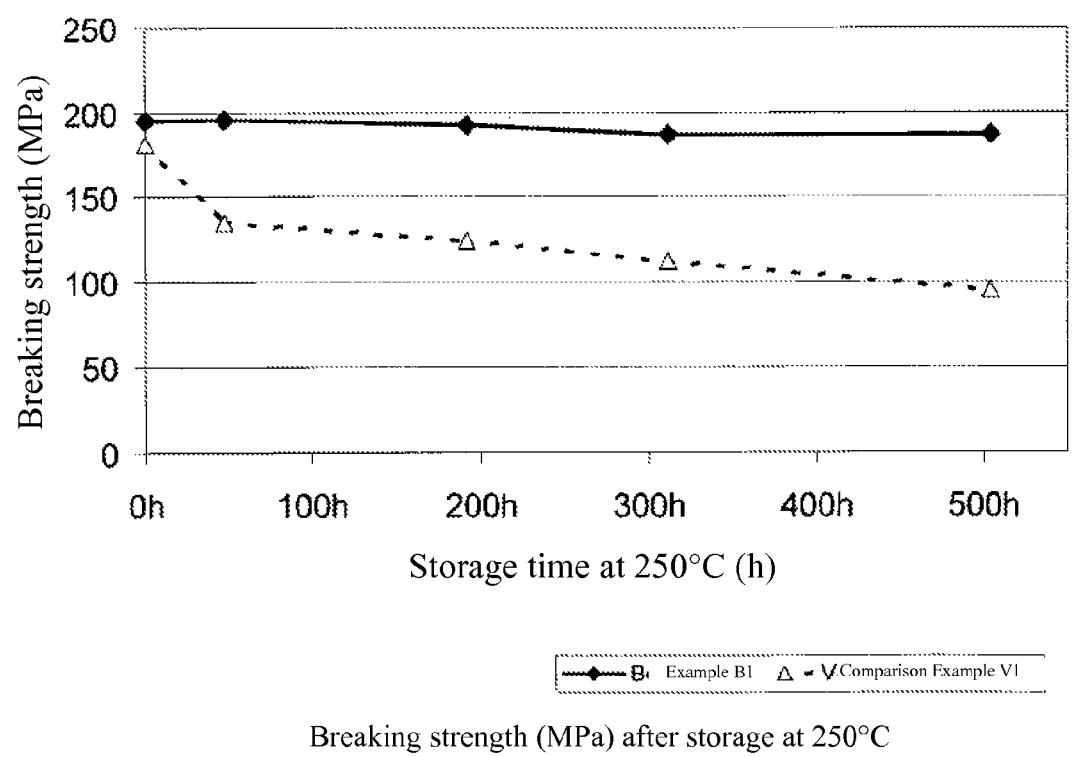
Breaking strength (MPa) after storage at 250°C

SEMIAROMATIC MOLDING COMPOUNDS AND USES THEREOF

CROSS-REFERENCE TO A RELATED APPLICATION

This application claims the benefit of European Patent Application No. 11 004 967.3 filed Jun. 17, 2011, the disclosure of which is incorporated herein by reference.

TECHNICAL FIELD

The present invention concerns heat-aging-resistant polyamide molding compounds based on semicrystalline, semiaromatic polyamides, a method for preparing them, and their usages.

BACKGROUND OF THE INVENTION

Thermoplastic polyamides are frequently used in the form of glass-fiber-reinforced molding compounds as construction materials for components that are exposed to high temperatures during their service life, ending with thermooxidative damage. The occurrence of thermooxidative damage, which is manifested, for example, in a decline of the mechanical characteristics, can be delayed through the addition of known heat stabilizers, but it cannot be permanently prevented. Improvement of the heat aging stability of polyamides is absolutely desirable, since through this longer service lives for thermally stressed components can be achieved or the risk of failure thereof can be reduced. Alternatively, improved heat aging stability can also enable the use of components at higher temperatures.

The heat aging stability in the known polyamide molding compounds, especially over longer periods of exposure to heat and at temperatures higher than 200° C., is still insufficient.

For improvement of the processability of semiaromatic polyamides of type proposed, PA9T, US 2003/0023008 A1 proposes the addition of specific polyamides having a carbon/amide ratio of 7-12 in a concentration of 10-50 wt %. The glass transition and crystallization temperatures of PA9T are said to be clearly reduced, while the melt temperature is retained, so that lower mold temperatures and thus conventional heating of the injection molds are enabled. As Comparison Example CE5 confirms, the blend of PA9T with 20 wt % PA6, however, is not seen to be advantageous. Furthermore, no improved heat stability over the semiaromatic polyamide is shown.

WO 2006/74934 A1 concerns heat-stabilized molten compounds based on a polyamide mixture and a transition metal compound, which can be used, for example, in the engine region of automobiles or in the electric/electronics field. The polyamide mixture consists of at least 50 wt % of a semicrystalline or amorphous polyamide (a1), the melting point or glass transition point of which is at least 200° C., and a second, semicrystalline or amorphous polyamide (a2) having a maximum C/N ratio of 7, the melting or glass transition point of which lies at least 20° C. below that of (a1). The preferred transition metal is iron, which is used as iron oxide in the examples. The preferred polyamide (a2) is PA6. In the examples only the aliphatic polyamides PA46 and PA46/6 are used as blending components in combination with 25 wt % PA6. In addition, only the combination of copper- and iron stabilization shows an improvement of the heat resistance. As the Comparison Examples A-E clearly show, the addition of PA6 or PA11 to PA46 does not produce any improvement of the heat stability over a conventional copper-stabilized PA46.

US 2009/0127740 A1 describes a method for producing a component that consists of at least two parts that adhere to each other, where at least one part is made of a blend of semiaromatic and aliphatic amide. In the most preferred variant here, 65-95 wt % semiaromatic polyamide (A) is mixed with 5-35 wt % aliphatic polyamide (B) in order to improve the adhesion of thermoplastically overmolded parts produced on the basis of semiaromatic polyamide molding compounds. PA6 is also mentioned, among others, as aliphatic polyamide and incorporated in Example 1, but where specifically modified polyolefins must be added. Component (A) is composed of equal parts by weight PA 6T/DT and PA 6T/66 (D=2-methylpentanediamine). Nothing is reported about an improvement of the heat stability of these molding compounds.

BRIEF SUMMARY OF THE INVENTION

It is the task of the invention to make available polyamide molding compounds based on semicrystalline, semiaromatic amides, from which preferably components for the automobile and the electric/electronics fields can be made, which are characterized in particular by heat aging stability at temperatures of at least 180° C., especially at temperatures over 200° C., and a high thermal stability, especially over 220° C. (HDT A) and especially preferably over 240° C. (HDT A). Good heat aging stability here is understood to mean that the breaking strength and the breaking elongation are still 50% and 40% of the starting values after 2500 h at 220° C. and are still 60% and 50% of the starting values after 2500 h at 180° C. At the same time, the components have sufficient strength/stiffness at higher temperatures, in particular at temperatures above 100° C.

This task is solved by polyamide molding compositions having the following composition:
(A) 27-84.99 wt % of a polyamide mixture consisting of
  (A1) at least semiaromatic, semicrystalline polyamide having a melting point in the range of 255° C. to 330° C.,
  (A2) at least one caprolactam-containing polyamide having a caprolactam content of at least 50 wt % that is different from the at least one semiaromatic, semicrystalline polyamide (A1),
  where the total caprolactam content, i.e., the sum of caprolactam contained in polyamide (A1) and polyamide (A2) is 22-30 wt %, with respect to the polyamide mixture,
(B) 15-65 wt % of at least one filler and reinforcing agent,
(C) 0.01-3.0 wt % of at least one heat stabilizer,
(D) 0-5.0 wt % of at least one additive,
where the components (A)-(D) add up to 100 wt % and no metal salts and/or metal oxides of a transition metal of groups VB, VIIB, VIIB or VIIIB of the periodic table are added to the polyamide molding compound.

Moreover, the molding compound in accordance with the invention is preferably free of transition metals of groups VB, VIIB, VIIB or VIIIB of the periodic table. This means that no such transition metals or transition metal compounds are added to the molding compound.

The molding compounds in accordance with the invention are surprisingly characterized by their good heat aging stability over long periods of time. In particular, their breaking strength after 2500 hours ≧50% (determined as the differences of the breaking strength values per ISO 527 at time zero and at the end of storage at 220° C.). At the same time, the molding compounds in accordance with the invention do not soften until high temperatures are reached and have a thermal stability (HDT A) of at least 240° C.

BRIEF DESCRIPTION OF THE DRAWING

FIG. 1 depicts the breaking strength of a molding body in accordance with an embodiment of the invention as a function of storage time.

DETAILED DESCRIPTION OF THE INVENTION

In accordance with the invention a semiaromatic and at the same time semicrystalline polyamide having a melting point in the range of 255-330° C. is used as a component (A1) of the polyamide mixture or polyamide matrix A. The melting point of polyamides here is essentially only conditionally dependent on the molecular weight or the intrinsic viscosity of the polyamides, rather it is determined by the chemical composition through the choice of the corresponding monomers. Thus, the polyamides that can be used for the invention can vary over a wide range, assuming that their melting point lies within the said range. The melting points for the relevant semiaromatic and semicrystalline polyamides are tabulated standard parameters for the relevant polyamides, but they can also be reproduced by simple experiments.

A caprolactam-containing polyamide is understood in accordance with the invention to be a polyamide that can be prepared by polymerization of caprolactam or copolymerization/copolycondensation of caprolactam with other monomers. The caprolactam-containing polymer thus contains at least 50 wt % repeating units that are derived from caprolactam.

In order to give the filled reinforced molding compounds sufficient heat aging stability, a caprolactam-containing polyamide is added to the semicrystalline, semiaromatic polyamide so that the caprolactam content of the polyamide matrix is 22-30 wt %, preferably 23-29 wt %, and especially preferably 24-28 wt %. The heat aging stability cannot be further improved significantly by a higher caprolactam concentration, but the thermal stability of the molding compounds and the strength at high temperatures becomes too greatly reduced. The desired high heat aging stability can no longer be guaranteed with a caprolactam concentration of less than 22 wt % with respect to the sum of polyamides (A1) and (A2).

In a preferred polyamide molding compound in accordance with the present invention the polyamide mixture A consists of
(A1) 70-78 wt % of at least one semiaromatic, semicrystalline polyamide having a melting point in the range of 255-330° C., and
(A2) at least one caprolactam-containing polyamide having a caprolactam content of at least 50 wt %,
where component (A1) is free of caprolactam and aminocaproic acid, i.e., it does not contain any repeating units derived therefrom.

The parameters and content values indicated above are maintained in further compounds.

The polyamide molding compounds in accordance with the invention contain 27-84.99 wt %, preferably 30-79.9 wt %, especially preferably 35-70 wt %, of a polyamide mixture consisting of semicrystalline, semiaromatic polyamides having a melting point of 255-330° C. (A1) and caprolactam-based polyamides that are different from A1 (A2).

The polyamide component (A2) consists of at least 50 wt %, preferably at least 60 wt %, and especially preferably at least 70 wt % caprolactam. The polyamide component (A2) is preferably a semicrystalline, aliphatic polyamide.

The total caprolactam content, i.e., the sum of the caprolactam contained in polyamide (A1) and polyamide (A2) is 22-30 wt %, preferably 23-29 wt %, and especially preferably 24-28 wt %, with respect to the polyamide mixture of (A1) and (A2).

Preferably, the molding compound in accordance with the invention is free of polyolefins, in particular free of polyethylene-α-olefin copolymers.

Component (A1)

Component (A1) involves semicrystalline, semiaromatic polyamides that preferably have a glass transition temperature in the range of 90-140° C., preferably in the range of 110-140°, and especially in the range of 115-135° C.

The melting point of the polyamide (A1) lies in the range of 255-330° C., preferably in the range of 270-325° C., and especially in the range of 280-320° C.

Preferred semiaromatic, semicrystalline polyamides are prepared from
a) 30-100 mol %, especially 50-100 mol % terephthalic acid and/or naphthalene dicarboxylic acid, and 0-70 mol %, especially 0-50 mol %, of at least one aliphatic dicarboxylic acid having 6-12 carbon atoms, and/or 0-70 mol %, especially 0-50 mol % of at least one cycloaliphatic dicarboxylic acid having 8-20 carbon atoms, and/or 0-50 mol % isophthalic acid, with respect to the total amount of the dicarboxylic acids
b) 80-100 mol % of at least one aliphatic diamine having 4-18 carbon atoms, preferably 6-12 carbons, and 0-20 mol % of at least one cycloaliphatic diamine, preferably one having 6-20 carbons and/or 0-20 mol % of at least one araliphatic diamine such as PACM, MACM, IPDA, MXDA, and PXDA, with respect to the total amount of the diamines, and optionally
c) aminocarboxylic acids and/or lactams, each having 6-12 carbon atoms.

According to a preferred embodiment the semiaromatic polyamide of component (A1) is formed on the basis of at least 30 mol %, especially at least 50 mol % terephthalic acid and at least 80 mol % aliphatic diamines having 4-18 carbon atoms, preferably 6-12 carbon atoms, and optionally other aliphatic, cycloaliphatic and aromatic dicarboxylic acids as well as lactams and/or aminocarboxylic acids. Isophthalic acid and naphthalenedicarboxylic acid can be used besides the terephthalic acid as other aromatic dicarboxylic acids. Suitable aliphatic and cycloaliphatic dicarboxylic acids other than terephthalic acid that can be used have 6-36 carbon atoms and are used in a maximum amount of 70 mol %, especially a maximum of 50 mol %, with respect to the total amount of the dicarboxylic acids.

Moreover, it is preferable that the said aromatic dicarboxylic acids of the semiaromatic polyamide of component (A1) be chosen from the group: terephthalic acid, isophthalic acid, and mixtures thereof.

According to another preferred embodiment said, e.g., aliphatic dicarboxylic acids of the semiaromatic polyamide of component (A1) that can be used besides terephthalic acid are chosen from the group: adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimeric fatty acid (C36). Among the dicarboxylic acids, adipic acid, sebacic acid, dodecanedioic acid, isophthalic acid or a mixture of such dicarboxylic acids, especially adipic acid and isophthalic acid, and especially adipic acid alone are preferred.

According to another preferred embodiment, said aliphatic diamines of the semiaromatic polyamide of component (A1)

are chosen from the group: 1,4-butanediamine, 1,5-pentanediamine, 1,6-hexanediamine, 1,7-heptanediamine, 1,8-octanediamine, 1,9-nonanediamine, methyl-1,8-octanediamine, 1,10-decandiamine, 1,11-undecanediamine, 1,12-dodecanediamine, or a mixture of such diamines, where 1,6-hexanediamine, 1,10-decanediamine, 1,12-dodecanediamine, or a mixture of such diamines is preferred, where 1,6-hexanediamine and 1,10-decanediamine are especially preferred. In addition to said aliphatic diamines, cycloaliphatic and/or araliphatic diamines can be used in a concentration of 0-20 mol % with respect to the total amount of diamines.

Especially preferably, the high-melting polyamides are formed from the following components:
a) (A1a) Dicarboxylic acids:
  50-100 mol % aromatic terephthalic acid and/or naphthalenedicarboxylic acid, with respect to the total content of dicarboxylic acids that are present,
  0-50 mol % of an aliphatic dicarboxylic acid, preferably having 6-12 carbon atoms, and/or a cycloaliphatic dicarboxylic acid having preferably 8-20 carbon atoms, and/or isophthalic acid;
b) (A1b) Diamines:
  80-100 mol % of at least one aliphatic diamine having 4-18 carbon atoms, preferably 6-12 carbon atoms with respect to the total content of diamines that are present,
  0-20 mol % cycloaliphatic diamines, preferably having 6-20 carbon atoms, and/or araliphatic diamines such as PACM, MACM, IPDA, MXDA and PXDA,
  where the molar percentage of dicarboxylic acids in the high melting polyamides is 100% and the molar percentage of diamines makes up 100%, and optionally of:
c) (A1c) Aminocarboxylic acids and/or lactams, containing lactams having preferably 6-12 carbon atoms and/or aminocarboxylic acids having preferably 6-12 carbon atoms.

While the components (A1a) and (A1b) are largely used in equimolar amounts, the concentration of (A1c) is a maximum of 20 wt %, preferably a maximum of 15 wt %, especially a maximum of 12 wt %, in each case with respect to the sum of (A1a) to (A1c).

In addition to the components (A1a) and (A1b), which are used in largely equimolar amounts, dicarboxylic acids (A1a) or diamines (A1b) can be used to regulate the molecular weight or to compensate monomer losses in production of the polyamide, so that the concentration of one component (A1a) or (A1b) can predominate in its totality.

Suitable cycloaliphatic dicarboxylic acids are the cis- and/or trans-cyclohexane-1,4-dicarboxylic acid and/or cis- and/or trans-cyclohexane-1,3-dicarboxylic acid (CHDA).

The obligatorily used aliphatic diamines indicated above can be replaced by other diamines in a lesser amount of no more than 20 mol %, preferably no more than 15 mol %, and especially no more than 10 mol %, with respect to the total amount of diamines. For example, cyclohexanediamine, 1,3-bis(aminomethyecyclohexane (BAC), isophoronediamine, norbornanedimethylamine, 4,4'-diaminodicyclohexylmethane (PACM), 2,2-(4,4'-diaminodicyclohexyl)propane (PACP) and 3,3'-dimethyl-4,4'-diaminodicyclohexylmethane (MACM) can be used as cycloaliphatic diamines. As araliphatic diamines, m-xylylenediamine (MXDA) and p-xylylenediamine (PXDA) may be mentioned.

In addition to the described dicarboxylic acids and diamines, lactams and/or aminocarboxylic acids can also be used as polyamide-forming components (component (A1c)). Suitable compounds are, for example, caprolactam (CL), α,ω-aminocaproic acid, α,ω-aminononanoic acid, am-aminoundecanoic acid (AUA), lauryllactam (LL) and α,ω-aminododecanoic acid (ADA). The concentration of the aminocarboxylic acids and/or lactams that are used together with the components (A1a) and (A1b) amount to a maximum of 20 wt %, preferably a maximum of 15 wt %, and especially preferably a maximum of 12 wt %, with respect to the sum of the components (A1a) through (A1c). Especially preferred are lactams or α,ω-amino acids having 4, 6, 7, 8, 11 or 12 C atoms. These are the lactams pyrrolidin-2-one (4 C atoms), ε-caprolactam (6 C atoms), enanthlactam (7 C atoms), capryllactam (8 C atoms), lauryllactam (12 C atoms) or the α,ω-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid.

In an especially preferred embodiment, component A1 is free of caprolactam or aminocaproic acid.

Regulators to control the molecular weight, relative viscosity or flowability or MVR in the form of monocarboxylic acids or monoamines can be added to the batch and/or the precondensate (before the postcondensation). Aliphatic, cycloaliphatic or aromatic monocarboxylic acids or monoamines that are suitable as regulators are acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol, among others. The regulators can be used individually or in a combination. Other monofunctional compounds that can react with an amino or acid group such as anhydrides, isocyanates, acid halides or esters, can also be used as regulators. The usual amount of regulators is between 10 and 200 mmol per kg of polymer.

The semiaromatic copolyamides (A1) can be prepared by substantially known methods. Suitable methods have been described elsewhere, and some of the possible methods that have been discussed in the patent literature will be given below. The disclosure contents of the following documents are expressly incorporated into the disclosure content of this application with regard to the method for preparation of the copolyamide of component (A): DE-A-195 13 940, EP-A-0 976 774, EP-A-0 129 195, EP-A-0 129 196, EP-A-0 299 444, U.S. Pat. No. 4,831,106, U.S. Pat. No. 4,607,073, DE-A-14 95 393 and U.S. Pat. No. 3,454,536.

Specific representatives of the polyamides (A1) in accordance with the invention are: PA 4T/4I, PA 4T/6I, PA 5T/5I, PA 6T/6, PA 6T/6I, PA 6T/61/6, PA 6T/66, 6T/610, 6T/612, PA 6T/10T, PA 6T/10I, PA 9T, PA 10T, PA 12T, PA 10T/10I, PA10T/106, PA10T/12, PA10T/11, PA 6T/9T, PA 6T/12T, PA 6T/10T/6I, PA 6T/6I/6, PA 6T/6I/12, and mixtures thereof; especially preferably, the semiaromatic polyamide of component (A) is chosen from the group: PA 6T/6I, PA 6T/66, PA 6T/10T, PA 6T/10T/6I, and mixtures thereof. Polyamides (A1) that contain 6T units, in particular at least 10 wt % 6T units, are preferred.

Therefore in accordance with the invention the following semiaromatic copolyamides are especially preferred as high-melting polyamides (A1):

a semicrystalline polyamide 6T/6I having 50-80 mol % hexamethyleneterephthalamide units and 20-50 mol % hexamethyleneisophthalamide units;

a semicrystalline polyamide 6T/6I having 55-75 mol % hexamethyleneterephthalamide units and 25-45 mol % hexamethyleneisophthalamide units;

a semicrystalline polyamide 6T/6I having 62-73 mol % hexamethyleneterephthalamide units and 25-38 mol % hexamethyleneisophthalamide units;

a semicrystalline polyamide 6T/6I having 70 mol % hexamethyleneterephthalamide units and 30 mol % hexamethyleneisophthalamide units;

a semicrystalline polyamide 6T/66 having 30-80 mol % hexamethyleneterephthalamide units and 20-70 mol % hexamethyleneadipamide units;

a semicrystalline polyamide 6T/66 having 50-70 mol % hexamethyleneterephthalamide units and 30-50 mol % hexamethyleneadipamide units;

a semicrystalline polyamide 6T/66 having 50-60 mol % hexamethyleneterephthalamide units and 40-50 mol % hexamethyleneadipamide units;

a semicrystalline polyamide 6T/66 having 55-60 mol % hexamethyleneterephthalamide units and 40-45 mol % hexamethyleneadipamide units;

a semicrystalline polyamide prepared from at least 50 mol % terephthalic acid and a maximum of 50 mol % isophthalic acid and a mixture of at least two diamines chosen from the group hexamethylenediamine, nonanediamine, methyloctanediamine, and decanediamine;

a semicrystalline polyamide prepared from at least 70 mol % terephthalic acid and a maximum of 30 mol % isophthalic acid and a mixture of hexamethylenediamine and dodecanediamine;

a semicrystalline polyamide prepared from at least 50 mol % terephthalic acid and a maximum of 50 mol % dodecanedioic acid and a mixture of at least two diamines chosen from the group hexamethylenediamine, nonanediamine, methyloctanediamine and decanediamine;

a semicrystalline polyamide 6T/10T having 10-60 mol %, preferably 10-40 mol %, hexamethyleneterephthalamide (6T) and 40-90 mol %, preferably 60-90 mol % decamethyleneterephthalamide (10T) units;

a semicrystalline polyamide 6T/10T/6I having 50-90 mol %, preferably 50-70 mol %, hexamethyleneterephthalamide units (6T), and 5-45 mol %, preferably 10-30 mol %, hexamethyleneisophthalamide units (6I), and 5-45 mol %, preferably 20-40 mol % decamethyleneterephthalamide (10T) units;

a semicrystalline polyamide 6T/6I/6 having 60-85 mol % hexamethyleneterephthalamide units (6T), and 15-40 mol % hexamethyleneisophthalamide units (6I), which additionally contains 5-15 wt % caprolactam.

The semiaromatic, semicrystalline polyamide (A1) has a solution viscosity $\eta_{rel}$, measured according to DIN EN ISO 307 on solutions of 0.5 g polymer in 100 mL m-cresol at a temperature of 20° C., of a maximum of 2.6, preferably a maximum of 2.3, especially a maximum of 2.0. Polyamides (A1) having a solution viscosity $\eta_{rel}$ in the range from 1.45-2.3, especially in the range from 1.5-2.0 or 1.5-1.8, are preferred.

The polyamides (A1) in accordance with the invention can be prepared in conventional polycondensation equipment via the process sequence precondensate and postcondensation. The described chain length regulators are preferably used for the polycondensation to regulate the viscosity. In addition, the viscosity can be established through the use of an excess of diamine or diacid.

Component (A2)

Component (A2) consists of caprolactam-containing polyamides having a caprolactam content of at least 50 wt %, preferably at least 60 wt %, and especially preferably at least 70 wt %. In particular, (A2) is polyamide PA 6.

For the case when component (A2) is a copolymer, preferred copolymers for (A2) that are used besides caprolactam are, for one, combinations of diamines and dicarboxylic acids, which are preferably used in equimolar or nearly equimolar amounts and, for another, lactams and aminocarboxylic acids.

Suitable diamines are, in particular, branched or linear aliphatic diamines having 4-18 C atoms. Suitable dicarboxylic acids are aliphatic, cycloaliphatic or aromatic dicarboxylic acids having 6-36 carbon atoms.

According to a first preferred embodiment the C4-C18 diamine is a diamine chosen from the group comprising 1,4-butanediamine, 1,5-pentanediamine, 2-methylpentanediamine, 1,6-hexanediamine, 1,7-heptadiamine, 1,8-octanediamine, 1,9-nonanediamine, methyl-1,8-octanediamine, 2,2,4-trimethylhexanediamine, 2,4,4-trimethylhexanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 4,4'-diaminodicyclohexylmethane (PACM), 2,2-(4,4'-diaminodicyclohexyl)propane (PACP), 3,3'-dimethyl-4,4'-diaminodicyclohexylmethane (MACM), m-xylylenediamine, p-xylylenediamine or mixtures of said diamines, where 1,6-hexanediamine, 1,10-decanediamine, 1,12-dodecanediamine, or a mixture of said diamines, where 1,6-hexanediamine and 1,10-decanediamine are preferred, and 1,6-hexanediamine by itself is especially preferred.

Suitable aliphatic dicarboxylic acids are adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and dimer fatty acid (C36). Suitable cycloaliphatic dicarboxylic acids are the cis- and/or trans-cyclohexane-1,4-dicarboxylic acid and/or cis- and/or trans-cyclohexane-1,3-dicarboxylic acid (CHDA). Suitable aromatic dicarboxylic acids are terephthalic acid, isophthalic acid and naphthalenedicarboxylic acid. Among the dicarboxylic acids, adipic acid, sebacic acid, dodecanedioic acid, isophthalic acid, terephthalic acid, or a mixture of such dicarboxylic acids, preferably adipic acid and terephthalic acid, and especially adipic acid by itself, are preferred.

Other preferred comonomers for the polyamide (A2) are optionally lactams or aminocarboxylic acids having 7-12 carbon atoms, where lauryllactam and aminolauric acid are especially preferred.

Especially preferred polyamides of type (A2) are copolyamides prepared from the monomers caprolactam and lauryllactam or caprolactam, hexanediamine and adipic acid or caprolactam, hexanediamine and terephthalic acid, thus copolyamides PA 6/12 or PA 6/66 or PA 6/6T or PA6/12/66 or PA6/66/610, the caprolactam content of which is at least 50 wt %.

The caprolactam-containing polyamide (A2) has a solution viscosity $\eta_{rel}$ in the range of 1.6-3.0, preferably in the range of 1.7-2.5, especially in the range of 1.8-2.2, measured according to DIN EN ISO 307 on solutions of 0.5 g polymer dissolved in 100 mL m-cresol at a temperature of 20° C.

Component (B)

According to another preferred embodiment of the proposed polyamide molding compound, the filler and reinforcing agents of component (B) are fibers, in particular glass and/or carbon fibers, where short fibers, preferably with a length in the range of 2-50 mm and a diameter of 5-40 µm and/or endless fibers (rovings) are preferably used and where in particular fibers having a circular and/or noncircular cross section are used, where in the latter case the cross-sectional aspect ratio (long axis of cross section to secondary axis) is in particular >2, preferably lies in the range of 2-8, and especially preferably lies in the range of 3-5.

Glass fibers having a noncircular cross section and a cross-sectional aspect ratio greater than 2, preferably 2-8, especially 3-5, are preferably used. These so-called flat glass fibers have an oval, elliptical, elliptical with constrictions (so-called "cocoon" [or "peanut"] fiber), rectangular, or nearly rectangular cross-sectional area.

The flat glass fibers in accordance with the invention that have a noncircular cross-sectional area are preferably used as short glass fibers (cut glass with a length of 0.2-20 mm, preferably 2-12 mm).

Another preferred characteristic of the flat glass fibers that are used is that the length of the main cross-sectional axis lies preferably in the range of 6-40 µm, especially in the range of 15-30 µm, and the length of the secondary cross-sectional axis lies in the range of 3-20 µm, especially in the range of 4-10 µm.

Mixtures of glass fibers with circular and noncircular cross sections can also be used to strengthen the molding compounds in accordance with the invention, where the amount of flat glass fibers as defined above is preferably predominant, i.e., more than 50 wt % of the total weight of the fibers.

If reinforced molding compounds having good flow properties and good surface quality are desired, especially in combination with flame retardants, then the reinforcing fibers preferably consist chiefly (i.e., for example, more than 80 wt % or even more than 90 wt %) of flat glass fibers or even exclusively of flat glass fibers.

The flat glass fibers used in accordance with the invention as roving (filler component (B)) have a diameter of 10-20 µm, preferably 12-18 µm, where the cross section of the glass fibers can be round, oval, elliptical, nearly rectangular or rectangular.

Especially preferred are the so-called flat glass fibers with a cross-sectional aspect ratio of 2-5. In particular, E glass fibers are used in accordance with the invention. However, all other types of glass fibers such as A, C, D, M, S and R glass fibers or any mixtures thereof or mixtures with E glass fibers can be used.

In the case of molding compounds reinforced with long fibers, higher toughnesses result and thus properties that are still more metal-like properties result if, instead of the conventional endless glass fibers having diameters of 15-19 µm, ones with diameters of 10-14 µm, especially ones with diameters of 10-12 µm are used.

The polyamide molding compounds in accordance with the invention can be prepared by the known methods for preparation of long fiber-reinforced rod-shaped pellets, in particular by pultrusion processes, in which the endless fiber strand (roving) is thoroughly soaked with the polymer melt and then chilled and chopped.

The long fiber-reinforced rod-shaped pellets obtained in this way, which preferably have a pellet length of 3-25 mm, especially 4-12 mm, can be further processed into molded objects using the conventional processing methods such as injection molding or pressing.

The endless carbon fibers used in the pultrusion process have a diameter of 5-10 µm, preferably 6-8 µm. To improve matrix binding and fiber handling, the fibers can be coated with chemically different layers, as are known in the prior art for glass and carbon fibers.

The glass fibers themselves, independent of the shape of the cross-sectional surface and length of the fibers, can be chosen from the group consisting of E glass fibers, A glass fibers, C glass fibers, D glass fibers, M glass fibers, S glass fibers, and/or R glass fibers, where E glass fibers are preferred.

The filler and reinforcing agents of component (B) can also be particulate fillers or a mixture of fibers and particulate fillers. In this case mineral fillers based on natural and/or synthetic layer silicates, talc, mica, silicate, quartz, titanium dioxide, wollastonite, kaolin, amorphous silicas, magnesium carbonate, magnesium hydroxide, chalk, limestone, feldspar, barium sulfate, solid or hollow glass beads or ground glass, permanently magnetic or magnetizable metal compounds, and/or alloys or mixtures can be preferably used as fillers. The fillers can also be surface-treated.

In the molding compounds in accordance with the invention, kaolins, serpentines, talc, mica, vermiculite, illite, smectite, montmorillonite, hectorite, double hydroxides, or mixtures thereof, for example, can be used as layer silicates. The layer silicates can be surface-treated but can also be untreated.

Component (C)

The thermoplastic molding compounds in accordance with the invention contain as component (C), 0.01-3 wt %, preferably 0.02-2 wt %, especially preferably 0.1-1.5 wt % of at least one thermostabilizer.

In a preferred embodiment the thermal stabilizers are chosen from the group consisting of Compounds of mono- and divalent copper, for example salts of mono- or divalent copper with inorganic or organic acids or a mono- or dihydric phenol, the oxides of mono- or divalent copper, or the complex compounds of copper salts with ammonia, amines, amides, lactams, cyanides or phosphines, preferably Cu(I) or Cu(II) salts of the halohydric acids, cyanohydric acids or the copper salts of aliphatic carboxylic acids. The monovalent copper compounds CuCl, CuBr, CuI, CuCN and $Cu_2O$, as well as the divalent copper compounds $CuCl_2$, $CuSO_4$, CuO, copper(II) acetate or copper(II) stearate are especially preferred. If a copper compound is used, the amount of copper is preferably 0.003-0.5, especially 0.005-0.3, and especially preferably 0.01-0.2 wt %, with respect to the sum of components (A) through (D).

The copper compounds are commercially available or their preparation is known to one skilled in the art. The copper compound can be used as such as or in the form of concentrates. A concentrate is understood to mean a polymer, preferably of the same chemical nature as component (A1) or (A2), that contains the copper salt in a high concentration. The use of concentrates is a conventional method and is employed especially often when very small amounts of a substance are to be added. The copper compounds are advantageously used in combination with other metal halides, especially alkali halides like NaI, KI, NaBr, KBr, where the mole ratio of metal halide to copper halide is 0.5-20, preferably 1-10, and especially preferably 3-7.

Stabilizers based on secondary aromatic amines, where these stabilizers are preferably present in an amount from 0.2-2, preferably 0.2-1.5 wt %.

Stabilizers based on sterically hindered phenols, where these stabilizers are preferably present in an amount of 0.1-1.5, preferably 0.2-1 wt %, and phosphites and phosphonites, and also
mixtures of the stabilizers indicated above.

Especially preferred examples of stabilizers based on secondary aromatic amines that can be used in accordance with the invention are adducts of phenylenediamine with acetone (Naugard A), adducts of phenylenediamine with linolene, Naugard 445, N,N'-dinaphthyl-p-phenylenediamine, N-phenyl-N-cyclohexyl-p-phenylenediamine or mixtures of two or more thereof.

Preferred examples of stabilizers based on sterically hindered phenols that can be used in accordance with the invention are N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethylbis-(3-(3,5-di-tert-butyl-4-hydroxyphenyl) propionate, 4,4'-butylidenebis(3-methyl-6-tert-butylphenol), triethylene glycol-3-(3-tert-butyl-4-hydroxy-5-methylphenyl) propionate, or mixtures of two or more of these stabilizers.

Preferred phosphites and phosphonites are triphenyl phosphite, diphenylalkyl phosphite, phenyl dialkyl phosphite, tris (nonylphenyl) phosphite, trilauryl phosphite, trioctadecyl phosphite distearylpentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,6-di-tert-butyl-4-methylphenyl) pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz-[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite and bis(2,4-di-tert-butyl-6-methylphenyl) ethyl phosphite. Especially preferred are tris[2-tert-butyl-4-thio-(2'-methyl-4'-hydroxy-5'-tertbutyl)phenyl-5-methyl] phenyl phosphite and tris(2,4-di-tert-butylphenyl)phosphite (Hostanox® PAR24, commercial product of Clariant, Basel).

An especially preferred embodiment of the thermostabilizer consists of the combination of organic heat stabilizers (in particular, Hostanox PAR 24 and Irganox 1010), a bisphenol A-based epoxide (in particular, Epikote 1001), and a copper stabilizer based on CuI and KI. A commercially available stabilizer mixture consisting of organic stabilizers and epoxides is, for example, Irgatec NC66 from Ciba Spez. GmbH. Thermal stabilization exclusively on the basis of CuI and KI is especially preferred. Besides the addition of copper or copper compounds, the use of other transition metal compounds, especially metal salts or metal oxides of groups VB, VIIB, VIIB or VIIIB of the periodic table, is excluded. Moreover, no transition metals of the groups VB, VIIB, VIIB or VIIIB of the periodic table such as iron or steel powders, are added to the molding compound in accordance with the invention.

Component (D)

The molding compounds in accordance with the invention can contain other additives (D) such as ones from the group of the photostabilization agents, UV stabilizers, UV absorbers or UV blockers, slip agents, dyes, nucleation agents, metallic pigments, antistatic agents, conductivity additives, demolding agents, optical brighteners, or mixtures of the said additives. Carbon black and/or carbon nanotubes, for example, can be used as antistatics in the molding compounds in accordance with the invention. However, the use of carbon black can also serve to improve the black coloration of the molding compound. The molded compound can, however, also be free of metallic pigments.

Moreover, the present invention concerns a method for producing such polyamide molding compounds. In addition it concerns molded objects that are produced using such polyamide molding compounds.

Applications

In addition, the invention concerns the uses of molded parts that consist at least partly of such polyamide molding compounds.

One may mention as examples for the automotive field: cylinder head covers, engine covers, housings for intercoolers, intercooler valves, intake pipes, especially intake manifolds, connectors, gear wheels, fan wheels, reserve coolant containers, housings or housing parts for heat exchangers, radiators, intercoolers, thermostats, water pumps, heaters, and fastening elements. In the electric/electronics field such uses include, for example, parts of circuit boards, housings, films, conductors, switches, terminal strips, relays, resistors, capacitors, coils, lamps, diodes, LEDs, transistors, connectors, controllers, memory, and sensors. Other embodiments are indicated in the dependent claims.

DESCRIPTION OF PREFERRED EMBODIMENTS

The invention will be described below using specific embodiment examples and compared with the lower-performing systems according to the prior art. The embodiment examples given below serve to support the invention and to provide evidence of the differences from the prior art, but they should not be employed to limit the general object of the invention as defined in the claims.

EXAMPLES B1-B5 AND COMPARISON EXAMPLES V1-V9

The molding compounds of the compositions given in Tables 1 and 2 are prepared on a twin-shaft extruder made by Werner and Pfleiderer, Type ZSK25. The polyamide granules are dispensed together with the additives into the feed section, while the glass fibers are dispensed into the polymer melt through side feeder 3 of the housing unit in front of the nozzle. The housing temperature was set as a rising profile up to 330° C. 10 kg throughput was achieved at 150-200 rpm. After the strands had been cooled in a water bath and granulation and drying at 120° C. for 24 h, the granulate properties were measured.

The compounds were then injection-molded to ISO test bodies in an Arburg Allrounder 320-210-750 injection molding machine at cylinder temperatures of 325° C. to 340° C. in zones 1 to 4 and a "tool temperature" of 130° C.

FIG. 1 shows the result of heat storage at 250° C. The breaking strength of the molded bodies made from the molding compound in accordance with the invention (B1) remain nearly constant over a period of 500 h, while the breaking strength of the molded bodies made from the molding compounds of Comparison Example V1 falls to 50% of the starting value after 500 h of storage at 250° C.

Polyamides that were used:

PA 6T/66: Copolyamide of the monomers terephthalic acid, adipic acid, and 1,6-hexanediamine with a mol ratio of terephthalic acid to adipic acid of 55 to 45 and a relative solution viscosity of 1.60.

PA 6: Grilon A28 with a relative solution viscosity of 1.86 (EMS Chemicals AG).

PA 6/12: Copolyamide of the monomers caprolactam and lauryllactam with a caprolactam content of 75 wt % and a relative viscosity of 1.90.

PA 1010: Homopolyamide of the monomers 1,10-decanediamine and sebacic acid with a relative viscosity of 1.95.

PA 46: Homopolyamide of the monomers 1,4-butanediamine and adipic acid with a relative viscosity of 1.88.

TABLE 1

Composition and properties of the compounds of the comparison examples of V1 through V9; all properties were measured in dry state

| | Unit | V1 | V2 | V3 | V4 | V5 | V6 | V7 | V8 | V9 |
|---|---|---|---|---|---|---|---|---|---|---|
| Composition | | | | | | | | | | |
| PA 6T/66 | wt % | 68.28 | 67.78 | 64.28 | 60.28 | 54.28 | 44.28 | 50.56 | 51.28 | |
| PA 46 | wt % | | | | | | | | | 50.78 |
| PA 6 | wt % | | | 4 | 8.00 | 14 | 24 | 16.90 | | 17 |
| PA 1010 | wt % | | | | | | | | 17.0 | |
| CLM content with respect to total polyamide | % | 0.0 | 0.0 | 5.9 | 11.7 | 20.5 | 35.1 | 25.0 | 0.0 | 25.1 |
| Kaolin | wt % | 0.28 | 0.28 | 0.28 | 0.28 | 0.28 | 0.28 | | 0.28 | 0.28 |
| Copper stabilizer | wt % | 0.24 | 0.24 | 0.24 | 0.24 | 0.24 | 0.24 | 0.74 | 0.24 | 0.74 |
| Iron oxide ($Fe_2O_3$) | wt % | | 0.5 | | | | | 0.60 | | |
| Glass fiber | wt % | 30.0 | 30.0 | 30.0 | 30.0 | 30.0 | 30.0 | 30.0 | 30.0 | 30.0 |
| Black master batch | wt % | 1.20 | 1.20 | 1.20 | 1.20 | 1.20 | 1.20 | 1.20 | 1.20 | 1.20 |
| Heat storage, 180° C./2500 h | | | | | | | | | | |
| Modulus of elasticity in tension | MPa | 11020 | 10900 | 10790 | 10320 | 10600 | 10700 | 11100 | 10900 | n.b. |
| Breaking strength | MPa | 91 | 90 | 87 | 102 | 110 | 135 | 132 | 99 | n.b |
| Retention of breaking strength | % | 50 | 53 | 47 | 60 | 65 | 75 | 69 | 52 | n.b |
| Breaking elongation | % | 0.9 | 0.9 | 1.1 | 1.1 | 1.3 | 1.7 | 1.5 | 1.0 | n.b. |
| Retention of breaking elongation | % | 39 | 41 | 41 | 44 | 52 | 59 | 58 | 38 | n.b. |
| Heat storage, 220° C./2500 h | | | | | | | | | | |
| Modulus of elasticity in tension | MPa | vv | vv | 6730 | 9300 | 10800 | 10950 | 11300 | vv | vv |
| Breaking strength | MPa | vv | vv | 32 | 67 | 80 | 130 | 120 | vv | vv |
| Retention of breaking strength | % | 0 | 0 | 17 | 40 | 27 | 72 | 63 | 0 | 0 |
| Breaking elongation | % | vv | vv | 0.6 | 0.8 | 0.8 | 1.5 | 1.2 | vv | vv |
| Retention of breaking elongation | % | 0 | 0 | 26 | 30 | 32 | 52 | 46 | 0 | 0 |
| Mechanical properties at 23° C. | | | | | | | | | | |
| Modulus of elasticity in tension | MPa | 10570 | 10000 | 10600 | 9440 | 10200 | 9980 | 10600 | 10770 | 8100 |
| Breaking strength | MPa | 182 | 169 | 185 | 169 | 170 | 180 | 190 | 189 | 158 |
| Breaking elongation | % | 2.3 | 2.2 | 2.7 | 2.5 | 2.5 | 2.9 | 2.6 | 2.6 | 3.1 |
| Impact strength | $kJ/m^2$ | 51 | 33 | 45 | 40 | 45 | 60 | 48 | 53 | 59 |
| Notched-bar impact strength | $kJ/m^2$ | 8.4 | 4.8 | 8.0 | 7.6 | 8.0 | 8.8 | 7.8 | 8.7 | 7.9 |
| Mechanical properties at 220° C. and thermal stability HDT A/HDT C | | | | | | | | | | |
| Modulus of elasticity in tension | MPa | 2650 | n.b. | 2600 | 1520 | n.b. | n.b. | n.b. | n.b | n.b. |
| Breaking strength | MPa | 58 | n.b. | 54 | 30 | n.b. | n.b. | n.b. | n.b. | n.b. |
| Breaking elongation | % | 9.1 | n.b. | 9.0 | 8.0 | n.b. | n.b. | n.b. | n.b. | n.b. |
| HDT A | ° C. | >280 | >280 | >280 | 280 | 262 | 215 | 256 | 197 | >280 |
| HDT C | ° C. | 178 | 180 | 176 | 174 | 172 | 135 | 170 | 133 | n.b. |

(Abbreviations: vv = completely embrittled, n.b. = not determined)

TABLE 2

Composition and properties of the compounds of Examples B1 through B5;
all properties were measured in dry state.

| | |
|---|---|
| Kaolin: | Aminosilane, coated, calcined aluminum silicate |
| Black master batch: | Master batch containing 25 wt % carbon black in polyamide 66. |
| Copper stabilizer: | Mixture of 14.3 wt % copper(I) iodide and 85.7 wt % potassium iodide/calcium distearate (98:2). |
| Irgatec NC 66: | Heat stabilizer mixture from Ciba Spez. GmbH |
| Glass fiber: | Vetrotex 995: Cut glass fiber with a length of 4.5 mm and a diameter 10 μm (circular cross section) from Owens Corning Fiberglas |
| Iron oxide | Sicotrans Red, K2915, $D_{50}$ = 400 nm (BASF) |

| | Unit | B1 | B2 | B3 | B4 | B5 |
|---|---|---|---|---|---|---|
| *Composition* | | | | | | |
| PA 6T/66 | wt % | 51.28 | 50.78 | 47.78 | 51.28 | 47.78 |
| PA 6 | wt % | 17.00 | 17.00 | 20 | 16 | |
| PA 6/12 | wt % | | | | | 20.0 |
| CLM content with respect to total polyamide | % | 24.9 | 25.1 | 29.5 | 23.4 | 22.1 |
| Kaolin | wt % | 0.28 | 0.28 | 0.28 | 0.28 | 0.28 |
| Copper stabilizer | wt % | 0.24 | 0.24 | 0.24 | 0.24 | 0.24 |
| Irgatec NC 66 | wt % | | 0.5 | 0.5 | 1.0 | 0.5 |
| Glass fiber | wt % | 30.0 | 30.0 | 30.0 | 30.0 | 30.0 |
| Black master batch | wt % | 1.20 | 1.20 | 1.20 | 1.20 | 1.20 |
| *Heat storage, 180° C./2500 h* | | | | | | |
| Modulus of elasticity in tension | MPa | 11060 | 11140 | 10980 | 11150 | 10560 |
| Breaking strength | MPa | 135 | 138 | 140 | 130 | 130 |
| Retention of breaking strength | % | 69 | 70 | 72 | 67 | 69 |
| Breaking elongation | % | 1.5 | 1.5 | 1.7 | 1.6 | 1.6 |
| Retention of breaking elongation | % | 58 | 54 | 61 | 57 | 62 |
| *Heat storage, 220° C./2500 h* | | | | | | |
| Modulus of elasticity in tension | MPa | 11450 | 11300 | 11250 | 11350 | 10440 |
| Breaking strength | MPa | 130 | 126 | 135 | 125 | 105 |
| Retention of breaking strength | % | 66 | 64 | 69 | 64 | 56 |
| Breaking elongation | % | 1.3 | 1.3 | 1.4 | 1.3 | 1.1 |
| Retention of breaking elongation | % | 50 | 46 | 50 | 46 | 42 |
| *Mechanical properties at 23° C.* | | | | | | |
| Modulus of elasticity in tension | MPa | 10550 | 10530 | 10300 | 10560 | 10600 |
| Breaking strength | MPa | 197 | 197 | 195 | 195 | 189 |
| Breaking elongation | % | 2.6 | 2.8 | 2.8 | 2.8 | 2.6 |
| Impact strength | $kJ/m^2$ | 49 | 47 | 50 | 45 | 47 |
| Notched-bar impact strength | $kJ/m^2$ | 8.2 | 8.2 | 8.3 | 8.0 | 8.8 |
| *Mechanical properties at 220° C. and thermal stability HDT A/HDT C* | | | | | | |
| Modulus of elasticity in tension | MPa | 2500 | 2540 | n.b. | 2600 | n.b. |
| Breaking strength | MPa | 41 | 43 | n.b. | 48 | n.b. |
| Breaking elongation | % | 9.7 | 9.2 | n.b. | 9.5 | n.b. |
| HDT A | ° C. | 258 | 255 | 245 | 260 | 244 |
| HDT C | ° C. | 170 | 169 | 160 | 172 | 152 |

(Abbreviations: vv = completely embrittled, n.b. = not determined)

DISCUSSION OF RESULTS

It is shown by means of Table 2 that the addition of caprolactam-containing polyamides produces an improvement of the heat aging stability, particularly in high temperatures (220° C.). The basic mechanical properties were retained. Also, the thermal stability, expressed by HDT A, remains above 240° C.

In contrast, Table 1 shows that amounts of PA6 (V 1-V5) that are too low do not achieve the desired effect, which can be seen in the low breaking elongation of less than 1% after storage at 220° C. (or in the breaking elongation that can no longer be measured because of complete embrittlement). Higher amounts of caprolactam (V6) do achieve the desired heat aging stability, but do not achieve sufficient thermal stability. Also, the use of noncaprolactm-containing polyamides as component (A2) (V8) or aliphatic polyamides as components (A1) (V9) do not lead to satisfactory products. Additional stabilization by iron oxide (V7) does not lead to improved heat aging stability in the case of the blends of semiaromatic polyamides and caprolactam-containing polyamides in accordance with the invention. Slightly poorer heat aging stability was even seen under the given conditions. Also, the other iron oxide-containing polyamide blends have poorer mechanical properties than those of the polyamide blends in accordance with the invention.

To that extent, however, the teaching of WO 2006/074934 A1, which teaches that in purely aliphatic polyamide blends only a combination of copper-containing and iron-containing stabilizers leads to a clear improvement of the mechanical properties after storage under heat, surprisingly cannot be extended to semiaromatic polyamide compositions, as is shown by the examples.

The measurements were carried out according to the following standards and on the following test bodies.
Thermal Behavior:
Melting point, melt enthalpy and glass transition temperature (Tg):
ISO Standard 11357-11-2

Granulate

Differential Scanning calorimetry (DSC) was carried out at a heating rate of 20° C./min. The temperature of the onset is given as the glass transition temperature (Tg).

Relative Viscosity:

The relative viscosity ($\eta_{rel}$) was determined by DIN EN ISO 307 on solutions of 0.5 g polymer dissolved in 100 mL m-cresol at a temperature of 20° C.

Modulus of Elasticity in Tension, Breaking Strength and Breaking Elongation:

ISO 527 with a strain velocity of 5 mm/min,

ISO tension rod, standard; ISO/CD 3167, type A1, 170×20/10×4 mm, temperature 23° C.

Charpy Impact Strength:

ISO 179/*eU

ISO test rod, standard: ISO/CD 3167, type B1, 80×10×4 mm, temperature 23° C.

1=not instrumented, 2=instrumented

Charpy Notched Bar Impact Strength:

ISO 179/*eA

ISO test rod, standard: ISO/CD 3167, type B1, 80×10×4 mm, temperature 23° C.

* 1=not instrumented, 2=instrumented

HDT A (1.8 MPa) and HDT C (8 MPa):

ISO 75

ISO impact rod 80×10×4 mm

Heat Storage at 180° C./220° C./250° C.

The storage under heat was carried out on ISO tension rods (standard: ISO/CD 3167, type A1, 170×20/10×4 mm) in a circulating air oven (binder FD115) in accordance with DIN 12880 (class 2.0) at a temperature of 180° C., 220° C. or 250° C. After specific times test bodies were removed from the oven and, after cooling them to 23° C., were subjected to a tensile elongation test in accordance with ISO 527 at 23° C. and at a strain velocity of 5 mm/min.

The invention claimed is:

1. A polyamide molding compound having the following composition:
    (A) 27-84.99 wt % of a polyamide mixture consisting of
    (A1) at least one semiaromatic, semicrystalline polyamide having a melting point in the range of 255 to 330° C.,
    (A2) at least one caprolactam-containing polyamide that is different from the at least one semiaromatic, semicrystalline polyamide (A1) and that has a caprolactam content of at least 50 wt %,
    wherein the sum of the caprolactam contained in polyamide (A1) and polyamide (A2) is 22-30 wt %, with respect to the polyamide mixture,
    (B) 15-65 wt % of at least one filler and reinforcing agent,
    (C) 0.01-3.0 wt % of at least one thermal stabilizer,
    (D) 0-5.0 wt % of at least one additive,
    where the components (A)-(D) make 100 wt %, wherein no metal salts and/or metal oxides of a transition metal of the groups VB, VIIB, VIIB or VIIIB of the periodic table are present in the polyamide molding compound.

2. The polyamide molding compound according to claim 1, wherein the sum of the caprolactam-containing polyamide (A1) and polyamide (A2) is 23-29 wt % with respect to the polyamide mixture.

3. The polyamide molding compound according to claim 1, wherein the polyamide molding compound contains 30-79.9 wt % of the polyamide mixture.

4. The polyamide molding compound according to claim 1, wherein the melting point of the at least one semiaromatic, semicrystalline polyamide (A1) lies in the range of 270-325° C.

5. The polyamide molding compound according to claim 1, wherein the at least one semiaromatic, semicrystalline polyamide (A1) has a glass transition temperature in the range of 90-140° C.

6. The polyamide molding compound according to claim 1, wherein the at least one semiaromatic, semicrystalline polyamide (A1) has a solution viscosity $\eta$rel of a maximum of 2.6.

7. The polyamide molding compound according to claim 1, wherein the at least one semiaromatic, semicrystalline polyamide (A1) is prepared from
    a) dicarboxylic acids that contain at least 50 mol % terephthalic acid with respect to the total amount of dicarboxylic acids,
    b) diamines that contain at least 80 mol % aliphatic diamines having 4-18 carbon atoms with respect to the total amount of diamines, and optionally
    c) lactams and/or aminocarboxylic acids.

8. The polyamide molding compound according to claim 1, wherein the at least one semiaromatic, semicrystalline polyamide (A1) is prepared from
    a) 50-100 mol % terephthalic acid and/or naphthalenedicarboxylic acid and 0-50 mol % of at least one aliphatic dicarboxylic acid having 6-12 carbon atoms, and/or 0-50 mol % of at least one cycloaliphatic dicarboxylic acid having 8-20 carbon atoms, and/or 0-50 mol % isophthalic acid, with respect to the total amount of the dicarboxylic acids,
    b) 80-100 mol % of at least one aliphatic diamine having 4-18 carbon atoms, 0-20 mol % of at least one cycloaliphatic diamine, and/or 0-20 mol % of at least one araliphatic diamine with respect to the total amount of the diamines, and optionally
    c) aminocarboxylic acids and/or lactams, each having 6-12 carbon atoms.

9. The polyamide molding compound according to claim 1, wherein the at least one semiaromatic, semicrystalline polyamide (A1) is selected from the group consisting of PA 4T/4I, PA 4T/6I, PA 5T/5I, PA 6T/6, PA 6T/6I, PA 6T/6I/6, PA 6T/66, PA 6T/610, PA 10T/106, PA 6T/612, PA 6T/10T, PA 6T/10I, PA 9T, PA 10T, PA 12T, PA 10T/10I, PA10T/12, PA10T/11, PA 6T/9T, PA 6T/12T, PA 6T/10T/6I, PA 6T/6I/6, PA 6T/6I/12, and mixtures thereof.

10. The polyamide molding compound according to claim 1, wherein the at least one caprolactam-containing polyamide (A2) has a caprolactam content of at least 60 wt %.

11. The polyamide molding compound according to claim 1, wherein the at least one caprolactam-containing polyamide (A2) has a solution viscosity $\eta$rel in the range of 1.6-3.0.

12. The polyamide molding compound according to claim 1, wherein the at least one caprolactam-containing polyamide (A2) is selected from the group consisting of PA 6, PA 6/12, PA 6/66 and PA 6/6T.

13. The polyamide molding compound according to claim 1, wherein the at least one thermal stabilizer (C) is selected from the group consisting of
    a) compounds of mono- or divalent copper,
    b) stabilizers based on secondary aromatic amines,
    c) stabilizers based on sterically hindered phenols,
    d) phosphites and phosphonites, and
    e) mixtures of the above-mentioned stabilizers.

14. The polyamide molding compound according to claim 1, wherein the polyamide mixture (A) consists of
    (A1) 70-78 wt % of at least one semiaromatic, semicrystalline polyamide having a melting point in the range of 255-330° C., and
    (A2) at least one caprolactam-containing polyamide having a caprolactam content of at least 50 wt %, where component (A1) is free of repeating units derived from caprolactam and/or aminocaproic acid.

15. The polyamide molding compound according to claim 14, wherein the at least one semiaromatic, semicrystalline polyamide (A1) is selected from the group consisting of PA 4T/4I, PA 4T/6I, PA 5T/5I, PA 6T/6, PA 6T/6I, PA 6T/6I/6, PA 6T/66, PA 6T/610, PA 10T/106, PA 6T/612, PA 6T/10T, PA 6T/10I, PA 9T, PA 10T, PA 12T, PA 10T/10I, PA10T/12, PA10T/11, PA 6T/9T, PA 6T/12T, PA 6T/10T/6I, PA 6T/6I/6, PA 6T/6I/12, and mixtures thereof.

16. The polyamide molding compound according to claim 1, wherein the at least one filler and reinforcing agent (B) is selected from the group consisting of
 a) glass and/or carbon fibers and/or endless fibers,
 b) particulate fillers, and/or
 c) mixtures of glass and/or carbon fibers and particulate fillers.

17. The polyamide molding compound according to claim 16, wherein the glass and/or carbon fibers have a length in the range of 0.2-50 mm and/or a diameter from 5-40 μm.

18. The polyamide molding compound according to claim 16, wherein the particulate fillers are mineral fillers based natural and/or synthetic layer silicates, talc, mica, silicate, quartz, titanium dioxide, wollastonite, kaolin, amorphous silicas, magnesium carbonate, magnesium hydroxide, chalk, lime, feldspar, barium sulfate, solid or hollow glass beads or ground glass, permanently magnetic or magnetizable metal compounds and/or alloys and/or mixtures thereof.

19. A polyamide molding compound having the following composition:
 (A) 27-79.9 wt % of a polyamide mixture consisting of
 (A1) PA 6T/66,
 (A2) PA 6,
 where the sum of the caprolactam contained in polyamide (A1) and polyamide (A2), is 22-30 wt % with respect to the polyamide mixture,
 (B) 20-65 wt % glass fibers and layer silicates,
 (C) 0.1-3.0 wt % of a heat stabilizer containing at least one compound of mono- or divalent copper,
 (D) 0-5.0 wt % of at least one additive,
 where the components (A)-(D) add up to 100 wt %.

20. A molded object made from a polyamide molding compound according to claim 1, wherein the object is in the form of a component for the automotive or electric/electronics field, cylinder head covers, motor covers, housings for intercoolers, intercooler valves, intake pipes, intake manifolds, connectors, gear wheels, fan wheels, coolant containers, housings or housing parts for heat exchangers, radiators, intercoolers, thermostats, water pumps, heaters, fastening elements, in the form of an electric or electronic component, a circuitboard, a part of a circuitboard, a housing component, a film, a conductor, a switch, a terminal strip, a relay, a resistor, a capacitor, a coil, a lamp, a diode, an LED, a transistor, a connector, a controller, a memory, and/or a sensor.

* * * * *